(12) United States Patent  
Kubo

(10) Patent No.: US 8,155,653 B2
(45) Date of Patent: Apr. 10, 2012

(54) MOBILE RADIO TERMINAL AND COMMUNICATION PROCESSING METHOD

(75) Inventor: Yoshiyuki Kubo, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 357 days.

(21) Appl. No.: 12/560,825

(22) Filed: Sep. 16, 2009

(65) Prior Publication Data

US 2010/0151863 A1 Jun. 17, 2010

(30) Foreign Application Priority Data

Dec. 16, 2008 (JP) ................................. 2008-319863

(51) Int. Cl.
*H04W 36/00* (2009.01)

(52) U.S. Cl. ........ 455/436; 370/331; 370/332; 370/335; 455/434; 455/437; 455/438; 455/439; 455/440

(58) Field of Classification Search .................. 370/331, 370/332, 335; 455/434, 436–440, 456.1
See application file for complete search history.

(56) References Cited

U.S. PATENT DOCUMENTS

| | | | |
|---|---|---|---|
| 2005/0073977 A1* | 4/2005 | Vanghi et al. | 370/335 |
| 2006/0052104 A1* | 3/2006 | Kono | 455/436 |
| 2009/0036134 A1* | 2/2009 | Ryu et al. | 455/437 |
| 2010/0098023 A1* | 4/2010 | Aghili et al. | 370/331 |
| 2010/0130207 A1* | 5/2010 | Wu | 455/436 |
| 2010/0331011 A1* | 12/2010 | Vikberg et al. | 455/456.1 |

OTHER PUBLICATIONS

3GPP2 C.S0005-D V2.0, pp. 3-418-3-419.
3GPP TS 23.272 V8.0.0, pp. 39-40, Jun. 2008.

* cited by examiner

*Primary Examiner* — Kent Chang
*Assistant Examiner* — Dinh P Nguyen
(74) *Attorney, Agent, or Firm* — Maschoff Gilmore & Israelsen

(57) ABSTRACT

A mobile radio terminal stores transfer information indicating whether a base station to which the mobile radio terminal is connected is changed from a base station belonging to a second mobile communication network to a base station belonging to a first mobile communication network; and control the second communicating unit so as to search for a base station belonging to the second mobile communication network, when it is determined using the stored transfer information that the mobile radio terminal is on standby in a base station belonging to the first mobile communication network after the base station to which the mobile radio terminal is connected is changed from a base station belonging to the second mobile communication network to the base station belonging to the first mobile communication network.

20 Claims, 11 Drawing Sheets

MOBILE RADIO TERMINAL AND COMMUNICATION PROCESSING METHOD

CROSS-REFERENCE TO RELATED APPLICATION

This application is based upon and claims the benefit of priority from the prior Japanese Patent Application No. 2008-319863 filed on Dec. 16, 2008; the entire contents of which is incorporated herein by reference.

BACKGROUND OF THE INVENTION

1. Field of the Invention

The present invention relates to a mobile radio terminal and a communication processing method. In particular, the present invention relates to a mobile radio terminal and a communication processing method that provide a technique in which, in a mobile communication system integrating a cdma2000 system (cdma2000 1x Radio Transmission Technology (1x RTT) system/cdma2000 Evolution Data Only (EVDO) system) and an Evolved Universal Terrestrial Radio Access Network (E-UTRAN) system, a mobile radio terminal located within range of a cdma2000 base station can search for an E-UTRAN base station.

2. Description of the Related Art

The 3GPP (or 3GPP2), which is a standardization body for standardizing third-generation cellular phone standards, has been recently developing a specification of network architecture that is an evolved form of a 3G core network architecture. This specification is called "Evolved Packet Core (EPC)" in the 3GPP. The EPC integrates the E-UTRAN and a mobile communication network having a circuit switching network (CS network). Examples of the mobile communication network include the Universal Terrestrial Radio Access Network (UTRAN), GSM/EDGE Radio Access Network (GERAN), and cdma2000 1x RTT CS access network. The E-UTRAN is an evolved form of the UTRAN and is a radio access network using the Long Term Evolution (LTE) standard.

The 3GPP2 C.S0005-D (hereinafter referred to as "C.S0005") developed by the 3GPP2 defines Layer 3 signaling information and procedure in a cdma2000 1x RTT system (hereinafter referred to as "1x RTT system"). In the C.S0005, location information of a base station of a system other than the 1x RTT system is stored, as notification information, in advance in signaling information to be transmitted from a network. A mobile radio terminal (user equipment (UE)) obtains the location information stored in the signaling information to determine whether a base station of a different system is located near the 1x RTT base station to which the mobile radio terminal currently belongs. If the mobile radio terminal recognizes that a base station of a different system is located near the 1x RTT base station to which the mobile radio terminal currently belongs, the mobile radio terminal starts searching for a base station of the different system under predetermined conditions.

The 3GPP2 TS23.272 V8.0.0 (hereinafter referred to as "TS23.272") developed by the 3GPP2 defines a method of cooperative operation (CS Fallback) to be performed if, in the EPC integrating an E-UTRAN system and a mobile communication network having a CS network, a mobile radio terminal that is on standby in the E-UTRAN system performs a CS service. In the EPC having a CS Fallback function, a mobile radio terminal performs a standby operation typically in the E-UTRAN system. When a CS service event (e.g., CS outgoing event, CS incoming event, or CS Short Message Service (SMS) event), such as a CS incoming notification from the EPC or a service request within the mobile radio terminal, takes place, the mobile radio terminal connects to the UTRAN, GERAN, or cdma2000 1x RTT CS access network to perform the CS service and transmits and receives information to and from the network. Sections 6.4 and 7.2 describe processing to be carried out if a mobile radio terminal that is on standby in an E-UTRAN base station performs outgoing and incoming actions (outgoing and incoming calls) to and from a UTRAN or GERAN base station that provides CS services. A connection to the 1x RTT system is described in Annexes B2.2 and B2.3.

Annexes B2.2 and B2.3 define a processing sequence to be performed if a mobile radio terminal that is on standby in an E-UTRAN system performs an outgoing call to a 1x RTT system, and a processing sequence to be performed if there is an incoming call from the 1x RTT system. Specifically, Annexes B2.2 and B2.3 define a processing sequence to be performed between a mobile radio terminal and a network if the mobile radio terminal that is on standby in the E-UTRAN system performs an outgoing call to the 1x RTT system, and also define a processing sequence to be performed between the mobile radio terminal and the network if the mobile radio terminal that is on standby in the E-UTRAN system process an incoming call from the 1x RTT system. These sequences make it possible to provide a circuit switching service based on the 1x RTT system if when a mobile radio terminal is on standby in the E-UTRAN system.

SUMMARY OF THE INVENTION

According to the C.S0005 described above, if a cell is to be reselected in the 1x RTT system, a mobile radio terminal obtains location information of neighboring base stations to determine whether a base station of a different system is located near a 1x RTT base station to which the mobile radio terminal currently belongs. The location information is contained in notification information transmitted from a network. However, the C.S0005 does not describe how to handle the E-UTRAN system. Even if the location information contained in the notification information is obtained, the location information does not make it possible to determine whether to and when to start searching for an E-UTRAN base station.

In case where a CS Fallback outgoing or incoming call defined in the TS23.272 occurs, if a circuit switching service is completed after switching from an E-UTRAN base station to a 1x RTT base station, a mobile radio terminal is on standby in the 1x RTT system. However, if the reception signal strength of radio waves transmitted from the 1x RTT base station is strong enough, it is determined to be unnecessary to search for the E-UTRAN system. As a result, it is not possible to return to the E-UTRAN system capable of providing communication faster than the 1x RTT system.

The present invention has been made in view of the circumstances described above. An object of the present invention is to provide a mobile radio terminal and a communication processing method in which information indicating transfer from an E-UTRAN system and an event for the transfer are stored and used, so that it is possible to control a search for an E-UTRAN base station if the mobile radio terminal is on standby in a cdma2000 system (1x RTT system/1x EVDO system).

In order to attain the above-mentioned circumstances, a mobile radio terminal according to an aspect of the present invention includes: a first communicating unit configured to communicate with a base station belonging to a first mobile communication network including a circuit switching network; a second communicating unit configured to communicate with a base station belonging to a second mobile communication network connected to the first mobile communication network; a storage unit configured to store transfer information indicating whether a base station to which the mobile radio terminal is connected is changed from a base station belonging to the second mobile communication network to a base station belonging to the first mobile communication network; a determining unit configured to determine, by using the transfer information stored by the storage unit, whether, after the base station to which the mobile radio terminal is connected is changed from a base station belonging to the second mobile communication network to a base station belonging to the first mobile communication network, the mobile radio terminal is on standby in the base station belonging to the first mobile communication network; and a search control unit configured to control the second communicating unit so as to search for a base station belonging to the second mobile communication network, if the determining unit determines that the mobile radio terminal is on standby in a base station belonging to the first mobile communication network after the base station to which the mobile radio terminal is connected is changed from a base station belonging to the second mobile communication network to the base station belonging to the first mobile communication network.

In order to attain the above-mentioned circumstances, a mobile radio terminal according to another aspect of the present invention includes: a first communicating unit configured to communicate with a base station belonging to a first mobile communication network including a circuit switching network; a second communicating unit configured to communicate with a base station belonging to a second mobile communication network connected to the first mobile communication network; a first storage unit configured to store communication request information indicating whether there is a communication request to the circuit switching network; a first determining unit configured to determine, by using the communication request information stored by the storage unit, whether, after a base station to which the mobile radio terminal is connected is changed from a base station belonging to the second mobile communication network to a base station belonging to the first mobile communication network, the mobile radio terminal is on standby in the base station belonging to the first mobile communication network; and a search control unit configured to control the second communicating unit so as to search for a base station belonging to the second mobile communication network, if the first determining unit determines that the mobile communication network is on standby in a base station belonging to the first mobile communication network after the base station to which the mobile radio terminal is connected is changed from a base station belonging to the second mobile communication network to the base station belonging to the first mobile communication network.

In order to attain the above-mentioned circumstances, a communication processing method according to an aspect of the present invention includes the steps of: preparing a mobile radio terminal having a first communicating unit configured to communicate with a base station belonging to a first mobile communication network including a circuit switching network and a second communicating unit configured to communicate with a base station belonging to a second mobile communication network connected to the first mobile communication network; storing transfer information indicating whether a base station to which the mobile radio terminal is connected is changed from a base station belonging to the second mobile communication network to a base station belonging to the first mobile communication network; and controlling the second communicating unit so as to search for a base station belonging to the second mobile communication network, if it is determined using the stored transfer information that the mobile radio terminal is on standby in a base station belonging to the first mobile communication network after the base station to which the mobile radio terminal is connected is changed from a base station belonging to the second mobile communication network to the base station belonging to the first mobile communication network.

In order to attain the above-mentioned circumstances, a communication processing method according to another aspect of the present invention includes the steps of: preparing a mobile radio terminal having a first communicating unit configured to communicate with a base station belonging to a first mobile communication network including a circuit switching network and a second communicating unit configured to communicate with a base station belonging to a second mobile communication network connected to the first mobile communication network; storing communication request information indicating whether there is a communication request to the circuit switching network; and controlling the second communicating unit so as to search for a base station belonging to the second mobile communication network, if it is determined using the stored communication request information that the mobile radio terminal is on standby in a base station belonging to the first mobile communication network after the base station to which the mobile radio terminal is connected is changed from a base station belonging to the second mobile communication network to the base station belonging to the first mobile communication network.

In order to attain the above-mentioned circumstances, a communication processing method according to another aspect of the present invention includes the steps of: preparing a mobile radio terminal having a first communicating unit configured to communicate with a base station belonging to a first mobile communication network including a circuit switching network and a second communicating unit configured to communicate with a base station belonging to a second mobile communication network connected to the first mobile communication network; controlling the second communicating unit so as to search for a base station belonging to the second mobile communication network, if the mobile radio terminal is on standby in a base station belonging to the first mobile communication network after the base station to which the mobile radio terminal is connected is changed from a base station belonging to the second mobile communication network to the base station belonging to the first mobile communication network.

In order to attain the above-mentioned circumstances, a communication processing method according to another aspect of the present invention includes the steps of: preparing a mobile radio terminal having a first communicating unit configured to communicate with a base station belonging to a first mobile communication network including a circuit switching network and a second communicating unit configured to communicate with a base station belonging to a second mobile communication network connected to the first mobile communication network; controlling the second communicating unit so as to search for a base station belonging to the second mobile communication network, if the mobile radio terminal is on standby in a base station belonging to the first mobile communication network after the base station to which the mobile radio terminal is connected is changed from a base station belonging to the second mobile communication network to the base station belonging to the first mobile communication network in accordance with a communication request to the circuit switching network.

DETAILED DESCRIPTION OF THE INVENTION

Hereinafter, embodiments of the present invention will be described with reference to the drawings.

Figure 1:
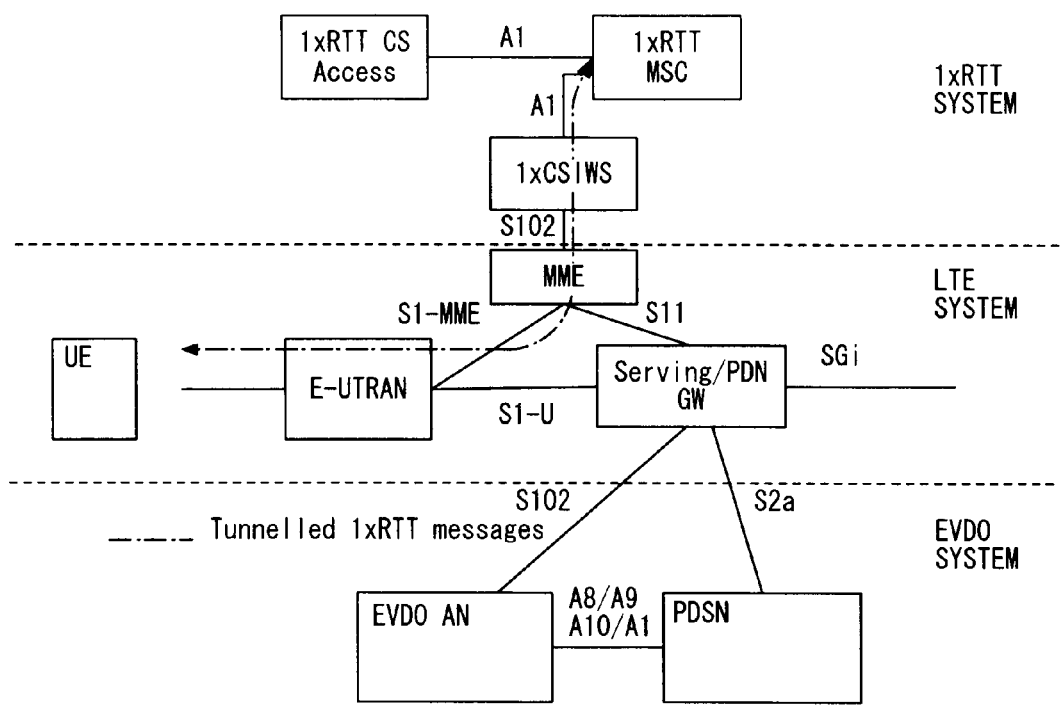
FIG. 1 illustrates a configuration of a mobile communication system according to an embodiment of the present invention.

FIG. 1 illustrates a configuration of a mobile communication system according to an embodiment of the present invention. As illustrated in FIG. 1, a 1x RTT system serving as an access method for circuit switching connection and an EVDO system serving as an access method for packet switching connection are connected to an EPC containing an E-UTRAN system (hereinafter referred to as "LTE system") serving as the 3.9th-generation access method. The mobile communication system is configured such that these systems can operate in cooperation with each other. Like an Evolved Packet System (EPS) described in the TS23.272, a mobile communication network covered by the present invention is configured as an integrated network including an E-UTRAN and a CS access network. In the mobile communication network, components of the EPC are connected such that they can cooperate with each other. Additionally, the mobile communication network is configured such that a mobile radio terminal that is on standby in an E-UTRAN base station can use CS services.

In the embodiments of the present invention, an integrated network (like an EPS) including an E-UTRAN and a CS access network that are connected to the EPC is defined as "integrated communication network". A UTRAN, a GERAN, or a cdma2000 1x RTT CS access network is defined as "CS access network". A 1x RTT system and an EVDO system are collectively referred to as "cdma2000 system".

The 1x RTT system is a system based on 3GPP2 A.S0001-A and A.S0008-C, and communicates with a mobile radio terminal (user equipment (UE)) in the cdma2000 1x RTT method. The EVDO system is a system based on 3GPP2 A.S0007-A and A.S0008-C, and communicates with a mobile radio terminal in the EVDO method. The LTE system is a system based on 3GPP TS23.401 v8.2.0 and 3GPP TS23.402 v8.2.0, and communicates with a mobile radio terminal in the E-UTRAN method, which is the 3.9th-generation access method.

The EPS has a CS Fallback function based on 3GPP TS23.272 v8.0.0. The CS Fallback function is a protocol used when a mobile radio terminal located in the LTE system performs a CS service in the 1x RTT system. The CS Fallback function defines a method of cooperative operation (CS Fallback) to be performed when the mobile radio terminal that is on standby in an E-UTRAN base station performs a CS service.

Figure 2:
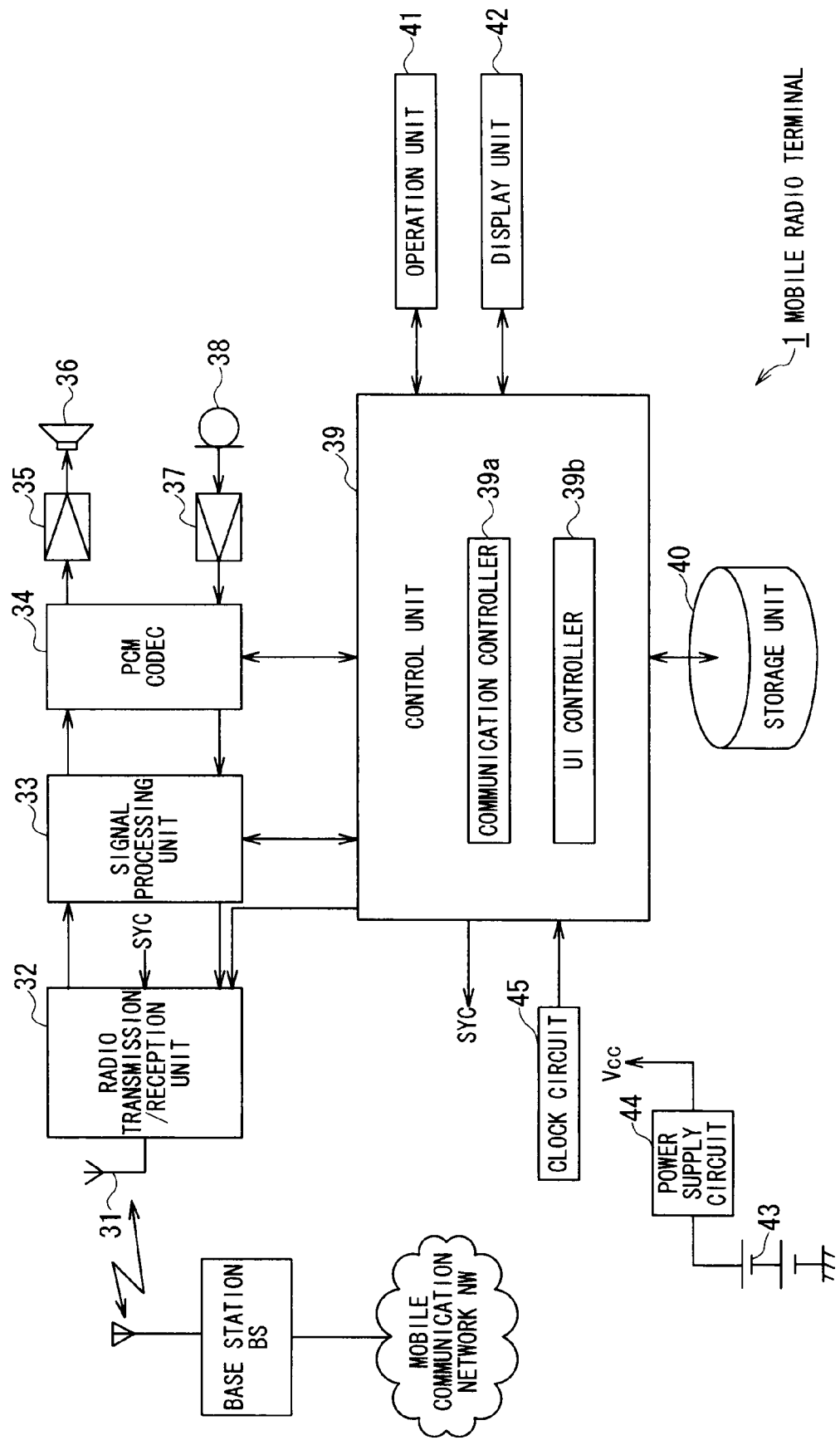
FIG. 2 is a block diagram illustrating an internal configuration of a mobile radio terminal according to an embodiment of the present invention.

FIG. 2 illustrates an internal configuration of a mobile radio terminal 1 according to an embodiment of the present invention. The mobile radio terminal 1 includes an antenna 31, a radio transmission/reception unit 32, a signal processing unit 33, a PCM codec 34, a reception amplifier 35, a speaker 36, a transmission amplifier 37, a microphone 38, a control unit 39, a storage unit 40, an operation unit 41, a display unit 42, batteries 43, a power supply circuit 44, and a clock circuit 45.

The mobile radio terminal 1 is capable of performing voice communication and data communication in any radio communication method, such as the cdma2000 1x RTT method, EVDO method, or E-UTRAN method, E-UTRAN method being a radio access method for the 3.9th-generation LTE system. The antenna 31, the radio transmission/reception unit 32, and the signal processing unit 33 support these communication methods. The CS access network method can take several methods, including the cdma2000 1x RTT method, a method using the UTRAN, and a method using the GERAN.

The antenna 31 receives, through the air, radio signals transmitted from a base station BS included in a mobile communication network NW with use of the 1x RTT system, EVDO system, or LTE system. In order to radio communication with the 1x RTT system, EVDO system, or LTE system, the antenna 31 radiates (transmits) radio signals with use of any of their access methods to the air. The mobile communication network NW and the base station BS are components of a mobile communication system. For simplification, only one base station BS is shown in FIG. 2. In practice, however, many base stations BS are included in the mobile communication network NW.

The mobile communication system has many radio zones. At least one base station BS is assigned to each of the radio zones. A frequency assigned to a radio zone differs from those assigned to its neighboring radio zones. The base station BS performs radio communication with the mobile radio terminal 1 at an assigned frequency. The mobile communication system according to an embodiment of the present invention is configured such that a CS service can be provided to the mobile radio terminal 1 if the mobile radio terminal 1 is located in the LTE system. The mobile communication system has a CS Fallback function described in the 3GPP TS23.272.

The radio transmission/reception unit 32 performs radio communication, via the antenna 31, with the base station BS included in the mobile communication network NW with use of the cdma2000 1x RTT method, EVDO method, or LTE method. On the basis of a modulation signal generated by the signal processing unit 33, the radio transmission/reception unit 32 generates a radio signal having a carrier frequency indicated by the control unit 39. Also, the radio transmission/reception unit 32 receives a radio signal having a carrier frequency indicated by the control unit 39, mixes the received radio signal with a local oscillation signal output from a frequency synthesizer, and frequency-converts (down-converts) the resulting signal into an intermediate frequency signal. Then, the radio transmission/reception unit 32 generates a reception baseband signal by performing quadrature demodulation (quadrature detection) on the down-converted intermediate frequency signal. The radio transmission/reception unit 32 outputs the reception baseband signal as a reception result to the signal processing unit 33 and the control unit 39.

The signal processing unit 33 includes a digital signal processor (DSP). The signal processing unit 33 applies predetermined signal processing to the reception baseband signal to obtain reception packet data with predetermined transmission format. Additionally, the signal processing unit 33 demodulates an audio signal included in the reception packet data, and decodes the resulting signal to obtain audio data etc. Also, the signal processing unit 33 encodes a transmission audio signal, generates a modulation signal on the basis of voice data obtained by encoding and other data, and outputs the generated modulation signal to the radio transmission/reception unit 32.

The control unit 39 includes a central processing unit (CPU), a read only memory (ROM), and a random access memory (RAM). The CPU executes various kinds of processing in accordance with programs stored in the ROM, or various application programs and control programs including an operating system (OS) loaded from the storage unit 40 into the RAM. Additionally, the CPU generates various control signals, supplies them to various parts, and thus controls an overall operation of the mobile radio terminal 1.

Specifically, the control unit 39 has a control function to realize audio communication and data communication with use of the 1x RTT system, EVDO system, and LTE system. The control unit 39 controls a carrier frequency used by the radio transmission/reception unit 32, and searches for a pilot signal on the basis of a result of reception in the radio transmission/reception unit 32. Additionally, the control unit 39 has a control function to change, at predetermined timing, a radio communication method that is set in the radio transmission/reception unit 32. The RAM stores data necessary for the CPU to execute various kinds of processing.

The control unit 39 includes one or more CPUs as necessary. Although the control unit 39 includes two CPUs in the embodiments of the present invention, the present invention is not limited to this. That is, the control unit 39 may include one, three, or more CPUs. A communication controller 39a includes a communication processing CPU to control communication processing. The communication controller 39a controls communication processing performed through the antenna 31, the radio transmission/reception unit 32, the signal processing unit 33, the PCM codec 34, the reception amplifier 35, and the transmission amplifier 37. A UI controller 39b includes a UI processing CPU to control UI processing performed through the storage unit 40, the operation unit 41, the display unit 42, and the clock circuit 45.

The storage unit 40 includes a hard disk drive (HDD) and a flash memory device, which is an electrically rewritable and erasable nonvolatile memory. The storage unit 40 stores various application programs executed by the CPUs of the control unit 39, various data groups, control programs and control data of the mobile radio terminal 1, and identification information uniquely assigned to the mobile radio terminal 1 or the user. The storage unit 40 also stores phonebook data containing names and phone numbers associated with each other, data obtained by data communication, and downloaded data. On the basis of an output from the batteries 43, the power supply circuit 44 generates a predetermined operation power supply voltage Vcc and supplies the generated operation power supply voltage Vcc to each circuit unit. The mobile radio terminal 1 has the clock circuit (timer) 45 for measuring the current time.

The mobile radio terminal 1 includes the reception amplifier 35, the speaker 36 that outputs an amplified reception voice signal, the transmission amplifier 37, the microphone 38 that inputs a transmission voice signal, the operation unit 41 that accepts requests from the user, and the display unit 42 that displays an image based on reception data.

First, a description will be given about a method in which, if the mobile radio terminal 1 is on standby in a cdma2000 base station (i.e., 1x RTT base station or EVDO base station), the mobile radio terminal 1 searches for an LTE base station using "LTE-to-Cdma2000 Inter-RAT" information (e.g., flag information) indicating whether the mobile radio terminal 1 has been transferred from an LTE base station to the cdma2000 base station.

Figure 3:
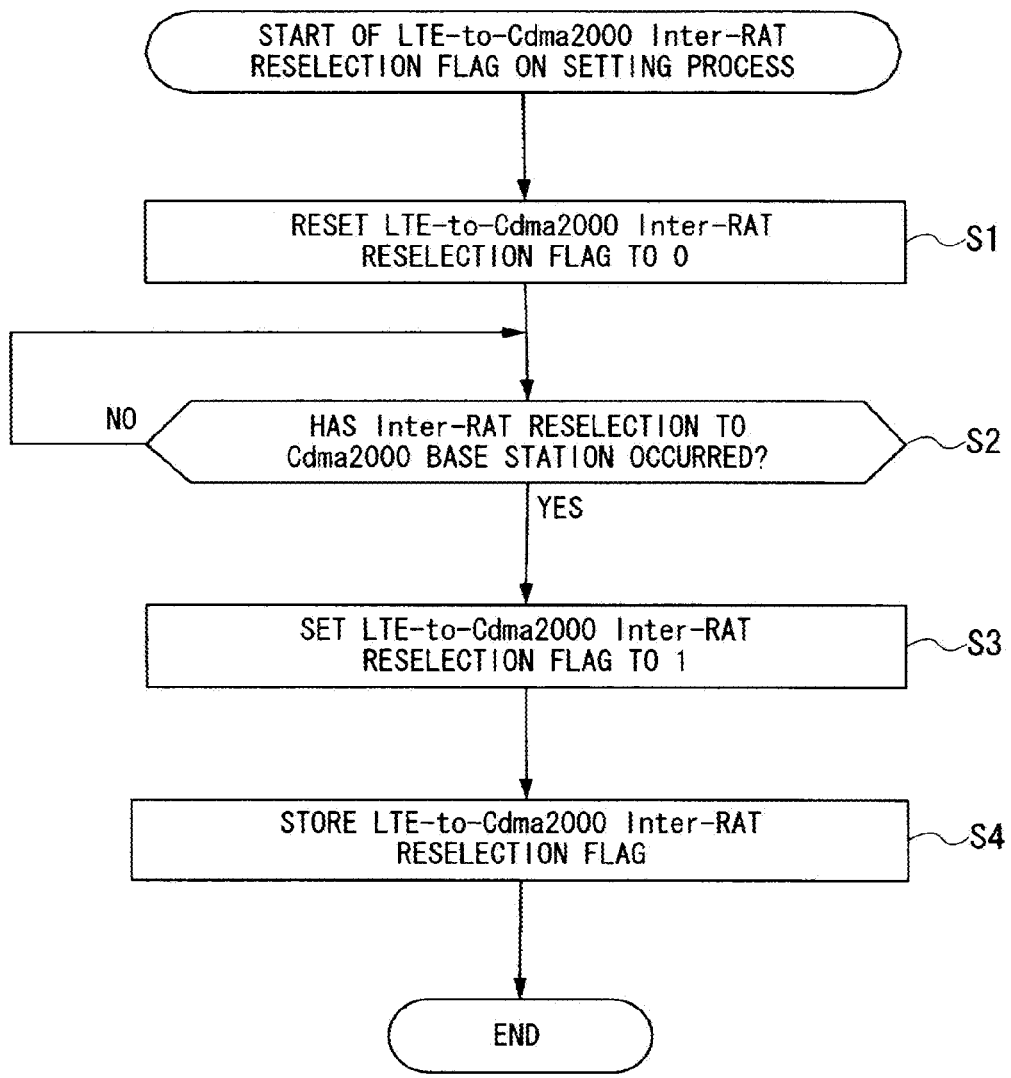
FIG. 3 is a flowchart illustrating an LTE-to-Cdma2000 Inter-RAT reselection flag ON setting process performed in the mobile radio terminal of FIG. 2.

With reference to the flowchart of FIG. 3, a description will be given about an LTE-to-Cdma2000 Inter-RAT reselection flag ON setting process performed in the mobile radio terminal 1 of FIG. 2. The LTE-to-Cdma2000 Inter-RAT reselection flag ON setting process is executed in parallel with execution of other communication processing when the mobile radio terminal 1 is on standby in an LTE system.

In step S1, if the mobile radio terminal 1 starts performing a standby operation in an LTE system (E-UTRAN system), the communication controller 39a resets an LTE-to-Cdma2000 Inter-RAT reselection flag stored in a predetermined memory area in the RAM of the control unit 39 to "0" ("OFF"). In step S2, the communication controller 39a determines whether a reselection (Inter-RAT reselection) from an LTE base station to a cdma2000 base station through use of the antenna 31, the radio transmission/reception unit 32, and the signal processing unit 33 has occurred. The communication controller 39a waits until the communication controller 39a determines that the reselection has occurred. If the communication controller 39a determines in step S2 that the reselection has occurred (YES in step S2), the process proceeds to step S3. In step S3, the communication controller 39a changes the standby operation to a standby operation in the cdma2000 base station. At the same time, the communication controller 39a sets the LTE-to-Cdma2000 Inter-RAT reselection flag to "1" ("ON"). In step S4, the communication controller 39a stores the LTE-to-Cdma2000 Inter-RAT reselection flag, which has been set to "1" ("ON") in step S3, in the predetermined memory area in the RAM of the control unit 39. After completion of the LTE-to-Cdma2000 Inter-RAT reselection flag ON setting process, the mobile radio terminal 1 performs a standby operation in the cdma2000 base station. The LTE-to-Cdma2000 Inter-RAT reselection flag, which is reset (to "0") in step S1, may be reset if the mobile radio terminal 1 is powered on or reset.

With reference to the flowchart of FIG. 4, a description will be given about an LTE-to-Cdma2000 Inter-RAT reselection flag OFF setting process (i.e., LTE-to-Cdma2000 Inter-RAT reselection flag ON setting cancellation process) performed in the mobile radio terminal 1 of FIG. 2. The LTE-to-Cdma2000 Inter-RAT reselection flag OFF setting process is executed in parallel with execution of other communication processing if the mobile radio terminal 1 is on standby in a cdma2000 system. The LTE-to-Cdma2000 Inter-RAT reselection flag OFF setting process is performed on the assumption that the LTE-to-Cdma2000 Inter-RAT reselection flag is set to "1" ("ON") in the LTE-to-Cdma2000 Inter-RAT reselection flag ON setting process described with reference to FIG. 3.

In step S21, the communication controller 39a determines whether a reselection (Inter-RAT reselection) from a cdma2000 base station to an LTE or cdma2000 base station through use of the antenna 31, the radio transmission/reception unit 32, and the signal processing unit 33 has occurred. The communication controller 39a waits until the standby operation determines that the reselection has occurred. Until this reselection occurs, the mobile radio terminal 1 continues to be on standby in the cdma2000 system.

If the communication controller 39a determines in step S21 that the reselection has occurred (YES in step S21), the process proceeds to step S22. In step S22, the communication controller 39a sets the LTE-to-Cdma2000 Inter-RAT reselection flag stored in the predetermined memory area in the RAM of the control unit 39 to "0" ("OFF"). That is, the LTE-to-Cdma2000 Inter-RAT reselection flag set to "1" ("ON") is reset to "0" ("OFF") by the communication controller 39a. In step S23, the communication controller 39a stores the LTE-to-Cdma2000 Inter-RAT reselection flag, which has been set to "0" ("OFF") in step S22, in the predetermined memory area in the RAM of the control unit 39. After completion of the LTE-to-Cdma2000 Inter-RAT reselection flag OFF setting process, the mobile radio terminal 1 performs a standby operation in the LTE or cdma2000 base station, which is a destination of the reselection.

The LTE-to-Cdma2000 Inter-RAT reselection flag indicates that the mobile radio terminal 1 has been transferred from an LTE base station to a cdma2000 base station. This means that there is an LTE base station near the cdma2000 base station where the mobile radio terminal 1 is currently on standby. In the case of the LTE-to-Cdma2000 Inter-RAT reselection flag OFF setting process illustrated in FIG. 4, if, while being on standby in one cdma2000 base station, the mobile radio terminal 1 has been transferred from this cdma2000 base station to another cdma2000 base station, it is not known whether there is an LTE base station near the latter cdma2000 base station to which the mobile radio terminal 1 belongs after the transfer. Therefore, the LTE-to-Cdma2000 Inter-RAT reselection flag is set to "0" in step S22.

Next, with reference to the flowchart of FIG. 5, a description will be given about an LTE system search determination process performed using an LTE-to-Cdma2000 Inter-RAT reselection flag in the mobile radio terminal 1 of FIG. 2. Before start of the LTE system search determination process, the mobile radio terminal 1 is on standby in a cdma2000 system, such as a 1x RTT system or an EVDO system. As illustrated in the flowcharts of FIG. 3 and FIG. 4, the LTE-to-Cdma2000 Inter-RAT reselection flag is set to "0" or "1".

Upon starting the process for determining whether to start an LTE system search while the mobile radio terminal 1 is on standby in a cdma2000 base station, the communication controller 39a determines in step S31 whether the LTE-to-Cdma2000 Inter-RAT reselection flag stored in the predetermined memory area in the RAM of the control unit 39 is set to "1" ("ON"). If the communication controller 39a determines in step S31 that the LTE-to-Cdma2000 Inter-RAT reselection flag is set to "1" ("ON") (YES in step S31), the process proceeds to step S32. In step S32, the communication controller 39a determines whether no search for an LTE base station has been performed after reselection to the cdma2000 system, or an elapsed time t from the start of the previous LTE system search has exceeded an LTE-system-search start criterion T_interval 1.

If the communication controller 39a determines in step S32 that a search for an LTE base station has failed after reselection to the cdma2000 system, and that the elapsed time t from the start of the previous LTE system search has not exceeded the LTE-system-search start criterion T_interval 1 (NO in step S32), the process returns to step S31. In this case, the mobile radio terminal 1 continues to be on standby in the cdma2000 system.

Figure 4:
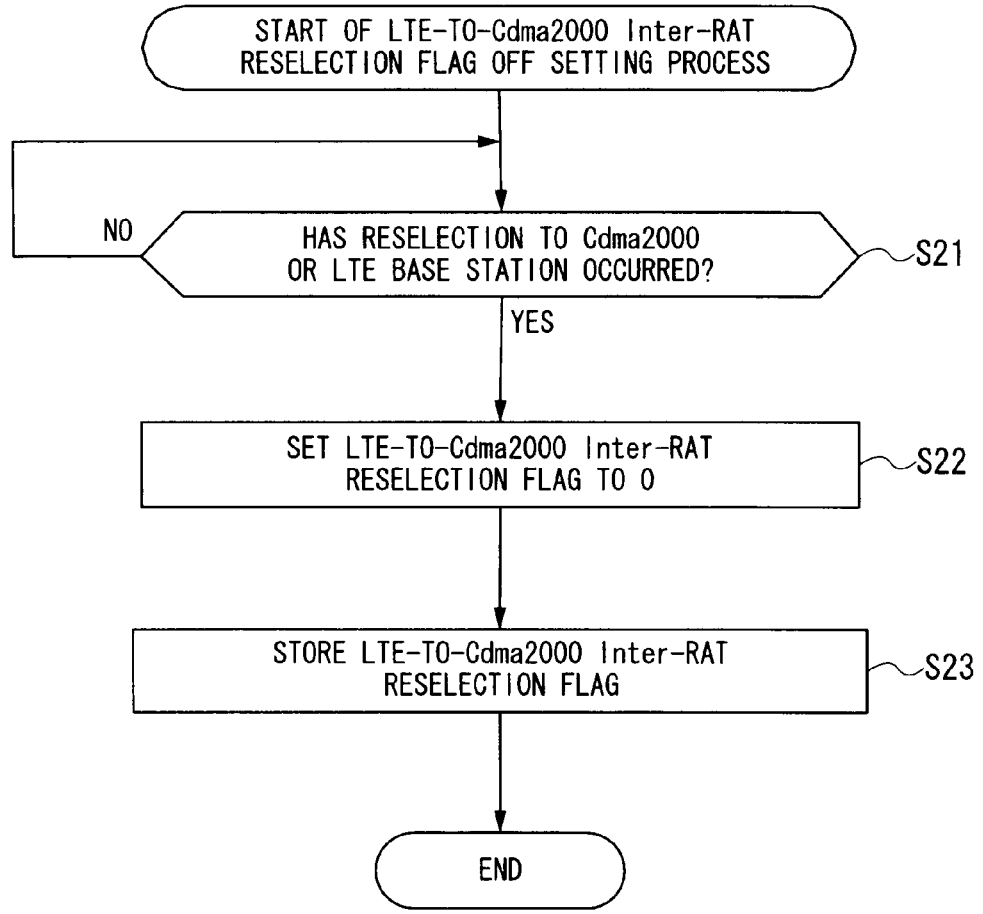
FIG. 4 is a flowchart illustrating an LTE-to-Cdma2000 Inter-RAT reselection flag OFF setting process performed in the mobile radio terminal of FIG. 2.
Figure 5:
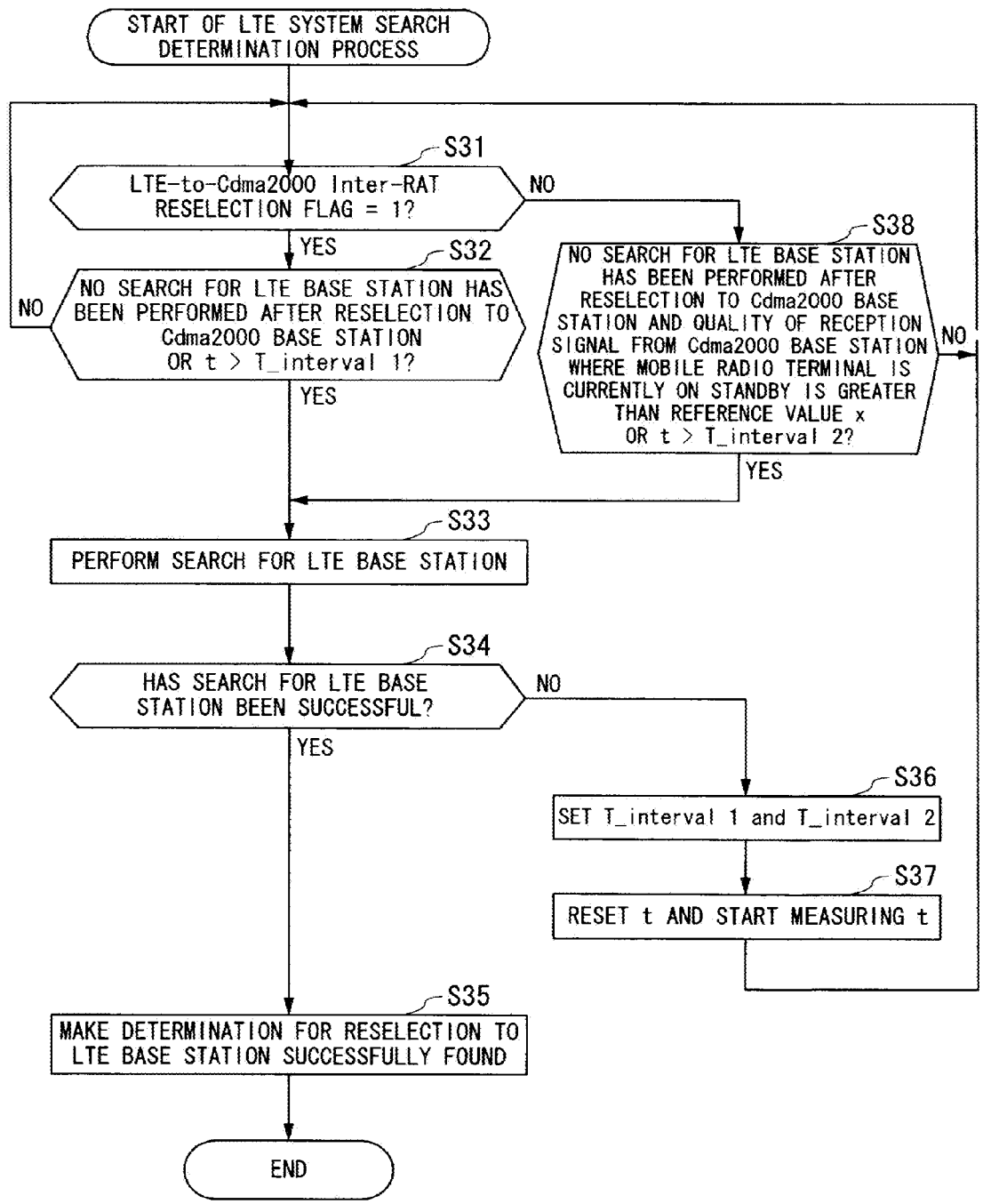
FIG. 5 is a flowchart illustrating an LTE system search determination process performed using an LTE-to-Cdma2000 Inter-RAT reselection flag in the mobile radio terminal of FIG. 2.

After reselection to the cdma2000 system, if a search for an LTE base station has been successfully completed and a reselection to the LTE base station has been performed, the LTE-to-Cdma2000 Inter-RAT reselection flag is set to "0" in the LTE-to-Cdma2000 Inter-RAT reselection flag OFF setting process of FIG. 4 without delay. Until the LTE-to-Cdma2000 Inter-RAT reselection flag is set from "1" to "0" again in the LTE-to-Cdma2000 Inter-RAT reselection flag OFF setting process, steps S31 and S32 of FIG. 5 are repeated.

If the communication controller 39a determines in step S32 that no search for an LTE base station has been performed after reselection to the cdma2000 system, or that the elapsed time t from the start of the previous LTE system search has exceeded the LTE-system-search start criterion T_interval 1 (YES in step S32), the process proceeds to step S33. In step S33, the communication controller 39a controls the antenna 31 and the radio transmission/reception unit 32 to search for an LTE base station. If the mobile radio terminal 1 searches for an LTE base station, the communication controller 39a controls the antenna 31 and the radio transmission/reception unit 32 to measure electric power from an LTE base station estimated to be located near the cdma2000 base station where the mobile radio terminal 1 is currently on standby, and starts obtaining synchronization with this LTE base station. If no or very little electric power from the LTE base station estimated to be located near the cdma2000 base station where the mobile radio terminal 1 is currently on standby is measured, the search for an LTE base station is determined to be unsuccessful.

In step S34, the communication controller 39a determines whether the search for an LTE base station has been successful. If the communication controller 39a determines in step S34 that the search for an LTE base station has been successful (YES in step S34), the process proceeds to step S35. In step S35, the communication controller 39a uses predetermined reselection criteria to determine whether to perform a reselection to the LTE base station successfully found. If the predetermined reselection criteria are met, the communication controller 39a controls the antenna 31, the radio transmission/reception unit 32, and the signal processing unit 33 to perform a reselection from the cdma2000 base station where the mobile radio terminal 1 is currently on standby to the LTE base station.

On the other hand, if the communication controller 39a determines in step S34 that the search for an LTE base station has been unsuccessful (NO in step S34), the process proceeds to step S36. In step S36, the communication controller 39a sets the LTE-system-search start criteria T_interval 1 and T_interval 2 to determine the period of time before start of the next LTE system search. The values T_interval 1 and T_interval 2 have a relationship of T_interval 1<T_interval 2. To determine the period of time before start of the next LTE system search, the communication controller 39a may set only the LTE-system-search start criterion T_interval 1, both the LTE-system-search start criteria T_interval 1 and T_interval 2, or only the LTE-system-search start criterion T_interval 2. The LTE-system-search start criterion T_interval 1 may not be a fixed value and may be changed. As will be described below, if it may not be possible to maintain synchronization because the quality of a reception signal of radio waves transmitted from the cdma2000 base station where the mobile radio terminal 1 is currently on standby is below a reference value, the LTE-system-search start criterion T_interval 1 may be set to be short in advance, so that an LTE base station which is more likely to be reselected as compared to this cdma2000 base station can be more frequently searched for (i.e., it is possible to increase the frequency of searching for an LTE base station). After the LTE-system-search start criteria T_interval 1 and T_interval 2 are set in step S36, the process proceeds to step S37.

In step S37, the communication controller 39a uses the clock circuit 45 to reset the elapsed time t from the start of the LTE system search and start measuring the elapsed time t from the start of the LTE system search again. Here, the mobile radio terminal 1 continues to be on standby in the cdma2000 system. Then, the process returns to step S31.

After a reselection from an LTE base station to a cdma2000 base station, if no transfer from one base station to another within the cdma2000 system occurs and the mobile radio terminal 1 is on standby in the cdma2000 base station with the LTE-to-Cdma2000 Inter-RAT reselection flag being set to "1", steps S31 and S32 are repeated until the elapsed time t from the start of the previous LTE system search exceeds the LTE-system-search start criterion T_interval 1. If the elapsed time t from the start of the previous LTE system search exceeds the LTE-system-search start criterion T_interval 1, the communication controller 39a determines in step S32 that the elapsed time t from the start of the previous LTE system search is greater than the LTE-system-search start criterion T_interval 1 (YES in step S32). Then, the process proceeds to step S33, where a search for an LTE base station is performed.

On the other hand, after a reselection from an LTE base station to a cdma2000 base station, if there is a transfer from one base station to another within the cdma2000 system (i.e., a reselection from a cdma2000 base station to another cdma2000 base station) and the mobile radio terminal 1 is on standby in the cdma2000 base station with the LTE-to-Cdma2000 Inter-RAT reselection flag being reset from "1" to "0", the communication controller 39a determines in step S31 that the LTE-to-Cdma2000 Inter-RAT reselection flag is not set to "1" ("ON") (NO in step S31). Then, the process proceeds to step S38. If the processes of FIG. 3 and FIG. 4 are not performed in the mobile radio terminal 1 and no LTE-to-Cdma2000 Inter-RAT reselection flag is provided, the process also proceeds from step S31 to step S38.

In step S38, the communication controller 39a determines whether no search for an LTE base station has been performed after the reselection to the cdma2000 base station and the quality of a reception signal transmitted from the cdma2000 base station where the mobile radio terminal 1 is currently on standby is greater than a reference value x (condition 1), or the elapsed time t from the start of the previous search for an LTE base station exceeds the LTE-system-search start criterion T_interval 2 (condition 2). If the quality of a reception signal transmitted from the cdma2000 base station where the mobile radio terminal 1 is currently on standby is greater than the reference value x, since the quality of a reception signal transmitted from the cdma2000 base station where the mobile radio terminal 1 is currently on standby is sufficient for maintaining synchronization with the cdma2000 base station, there is no need to perform a reselection to another cdma2000 base station.

If the communication controller 39a determines in step S38 that both the conditions 1 and 2 are not satisfied (NO in step S38), the process returns to step S31. In this case, the mobile radio terminal 1 continues to be on standby in the cdma2000 system. If the communication controller 39a determines in step S38 that either one of the conditions 1 and 2 is satisfied (YES in step S38), the process proceeds to step S33, where a search for an LTE base station is performed.

Thus, after the mobile radio terminal 1 is transferred from an LTE system to a cdma2000 system through an Inter-RAT reselection, if no reselection has been performed within the cdma2000 system (i.e., if the LTE-to-Cdma2000 Inter-RAT reselection flag is set to "1"), it is possible to assume that the LTE system where the mobile radio terminal 1 was on standby before the transfer to the cdma2000 system is located adjacent to the cdma2000 system. That is, it is possible to determine that the LTE system is present as a cell adjacent to the cdma2000 system to which the mobile radio terminal 1 is currently connected. Therefore, it is possible to search for an LTE base station at short time intervals (T_interval 1 (<T_interval 2)). Then, if it is necessary to perform a reselection to the LTE system, the reselection can be carried out with less delay.

On the other hand, if a reselection has been performed within the cdma2000 system to which the mobile radio terminal 1 has been transferred or there is originally no LTE-to-Cdma2000 Inter-RAT reselection flag information (i.e., if the LTE-to-Cdma2000 Inter-RAT reselection flag is set to "0"), it is not known whether there is an LTE base station adjacent to the cdma2000 base station where the mobile radio terminal 1 is currently on standby. In such a case, when a reselection within the cdma2000 system is performed and the mobile radio terminal 1 enters an area covered by another base station, it is highly possible that there is an LTE base station.

An LTE base station, for which it is not necessary to acquire new land in the process of service development, will be located in the same place as that of a cdma2000 base station. When a cdma2000 base station and an LTE base station are located in the same place, a distance from the LTE base station to the mobile radio terminal 1 will be substantially the same as that from the cdma2000 base station to the mobile radio terminal 1. In this case, if the quality of a reception signal transmitted from a cdma2000 base station where the mobile radio terminal 1 is currently on standby is good, it can be estimated that the quality of a reception signal of radio waves transmitted from an LTE base station located in the same place will be also good. Therefore, when the quality of a reception signal of radio waves transmitted from a cdma2000 base station is good, it will be easier to succeed in a search for an LTE base station, as compared to the case where a search for an LTE base station is performed when the quality of a reception signal of radio waves transmitted from the cdma2000 base station is bad.

Thus, it is possible to efficiently perform a search for an LTE base station. Additionally, for every transfer from one base station to another within a cdma2000 system where the mobile radio terminal 1 is on standby, it is possible to prepare for a reselection to an LTE system.

For example, a search for an LTE base station is performed in advance, and the resulting LTE system information (e.g., a center frequency of the LTE system, and an identification code for the base station) is stored. Then, if this base station information is used when the reception level of a cdma2000 base station is reduced, it is possible to quickly search for an LTE base station for reselection.

In another example, when the quality of a reception signal from a cdma2000 base station where the mobile radio terminal 1 is currently on standby is good and it is thus determined that there is no need to search for a neighboring base station and no need to perform a reselection, there may be a desire to perform a reselection to an LTE system because the LTE system is given a higher priority than the cdma2000 system. In such a case, even when the quality of a reception signal from the cdma2000 base station is good, it is possible to search for an LTE base station and perform a reselection to the LTE base station successfully found. Additionally, when no LTE system is present, the amount of electric power necessary to search for an LTE base station can be small, because measurement is completed by measuring only the amount of electric power allocated to the LTE system.

To perform a minimum search for an LTE base station, it is possible to perform an LTE system search every time T_interval 2 elapses. Thus, even when the mobile radio terminal 1 is moved in a place where the reception signal strength of radio waves transmitted from a cdma2000 base station is small, it is possible to effectively search for an LTE system.

Next, a description will be given about a method in which, while being on standby in a 1x RTT base station, the mobile radio terminal 1 searches for an LTE base station by using CS Fallback information (e.g., flag information) indicating whether outgoing/incoming processing in the 1x RTT system has been performed. Outgoing/incoming processing in a 1x RTT system is performed when, after a connection request for circuit switching communication occurs while the mobile radio terminal 1 is on standby in an LTE system, the mobile radio terminal 1 is transferred from the LTE system to the 1x RTT system.

Figure 6:
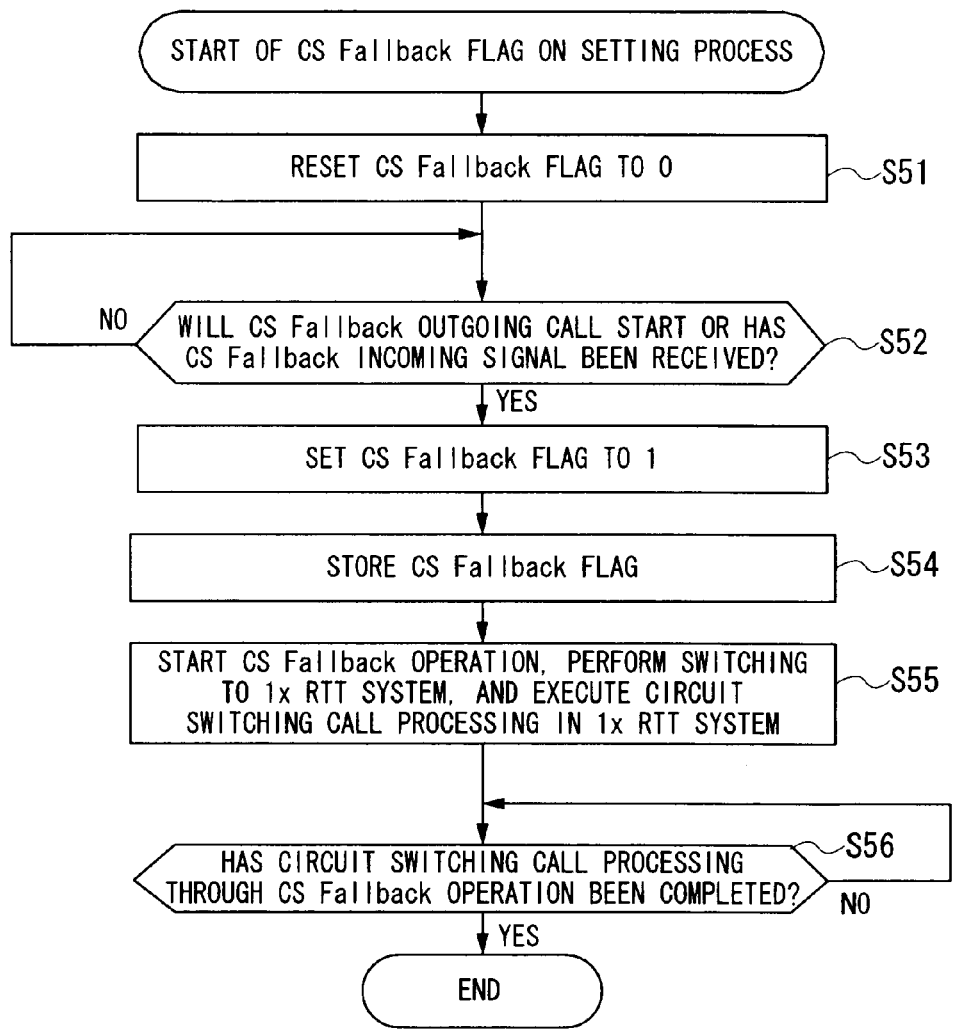
FIG. 6 is a flowchart illustrating a CS Fallback flag ON setting process performed in the mobile radio terminal of FIG. 2.

With reference to the flowchart of FIG. 6, a description will be given about a CS Fallback flag ON setting process performed in the mobile radio terminal 1 of FIG. 2. The CS Fallback flag ON setting process is executed in parallel with execution of other communication processing when the mobile radio terminal 1 is on standby in an LTE system.

In step S51, when the mobile radio terminal 1 starts performing a standby operation in an LTE system (E-UTRAN system), the communication controller 39*a* resets a CS Fallback flag stored in the predetermined memory area in the RAM of the control unit 39 to "0" ("OFF"). In step S52, the control unit 39 determines whether a CS Fallback outgoing call will start or a CS Fallback incoming signal has been received. The control unit 39 waits until it determines that a CS Fallback outgoing call will start or a CS Fallback incoming signal (CS Fallback incoming call signal) has been received. In the case of a CS Fallback outgoing call, the UI controller 39*b* in the control unit 39 recognizes, through a user interface (UI) in the mobile radio terminal 1, that there has been a user request, and informs the communication controller 39*a* of the result of the recognition. The communication controller 39*a* obtains the result of the recognition from the UI controller 39*b*. On the basis of the result of the recognition, the communication controller 39*a* determines to start a CS Fallback outgoing call. In the case of a CS Fallback incoming signal, the communication controller 39*a* determines whether a Paging message is included in a reception signal processed by the signal processing unit 33 and the Paging message contains information indicating CS Fallback. If the Paging message contains information indicating CS Fallback, the communication controller 39*a* determines that a CS Fallback incoming signal has been received.

In step S52, if the control unit 39 determines that a CS Fallback outgoing call will start or a CS Fallback incoming signal has been received, the process proceeds to step S53. In step S53, the communication controller 39*a* sets the CS Fallback flag to "1" ("ON"). This is for use in searching for an LTE base station after completion of a CS Fallback operation. In step S54, the communication controller 39*a* stores the CS Fallback flag, which has been set to "1" ("ON") in step S53, in the predetermined memory area in the RAM of the control unit 39. In step S55, the communication controller 39*a* controls the antenna 31, the radio transmission/reception unit 32, and the signal processing unit 33 to start a CS Fallback operation. In executing the CS Fallback operation, in order to perform circuit switching call processing from an LTE system, the mobile radio terminal 1 carries out a series of operations (e.g., system switching operations based on TS23.272) for switching from the LTE system to a 1x RTT system, and realizes a connection for circuit switching services in the 1x RTT system. In step S56, the communication controller 39*a* determines whether the circuit switching call processing through the CS Fallback operation has been completed. The communication controller 39*a* waits until the communication controller 39*a* determines that the circuit switching call processing through the CS Fallback operation has been completed. If the communication controller 39*a* determines in step S56 that the circuit switching call processing through the CS Fallback operation has been completed (YES in step S56), the communication controller 39*a* controls the antenna 31, the radio transmission/reception unit 32, and the signal processing unit 33 to terminate the connection with the 1x RTT system, and performs a standby operation in a 1x RTT base station.

With reference to the flowchart of FIG. 7, a description will be given about a CS Fallback flag OFF setting process (i.e., CS Fallback flag ON setting cancellation process) performed in the mobile radio terminal 1 of FIG. 2. The CS Fallback flag OFF setting process is executed in parallel with execution of other communication processing when the mobile radio terminal 1 is on standby in a cdma2000 system. The CS Fallback flag OFF setting process is performed on the assumption that the CS Fallback flag is set to "1" ("ON") in the CS Fallback flag ON setting process described with reference to FIG. 6.

In step S61, the communication controller 39*a* determines whether a reselection (Inter-RAT reselection) from a cdma2000 base station to an LTE base station through use of the antenna 31, the radio transmission/reception unit 32, and the signal processing unit 33 has occurred. The communication controller 39*a* waits until the communication controller 39*a* determines that the reselection has occurred. Until this reselection occurs, the mobile radio terminal 1 continues to be on standby in the cdma2000 system.

If the communication controller 39*a* determines in step S61 that the reselection has occurred (YES in step S61), the process proceeds to step S62. In step S62, the communication controller 39*a* sets the CS Fallback flag stored in the predetermined memory area in the RAM of the control unit 39 to "0" ("OFF"). That is, the CS Fallback flag set to "1" ("ON") is reset to "0" ("OFF") by the communication controller 39*a*. In step S63, the communication controller 39*a* stores the CS Fallback flag, which has been set to "0" ("OFF") in step S62, in the predetermined memory area in the RAM of the control unit 39. After completion of the CS Fallback flag OFF setting process, the mobile radio terminal 1 performs a standby operation in the LTE base station, which is a destination of the reselection.

With reference to the flowchart of FIG. 8, a description will be given about an LTE system search determination process performed using a CS Fallback flag in the mobile radio terminal 1 of FIG. 2. Before start of the LTE system search determination process, the mobile radio terminal 1 is on standby in a 1x RTT system included in a cdma2000 system. As illustrated in the flowcharts of FIG. 6 and FIG. 7, the CS Fallback flag is set to "0" or "1".

Upon starting the process for determining whether to start an LTE system search while the mobile radio terminal 1 is on standby in a 1x RTT base station, the communication controller 39a determines in step S71 whether the CS Fallback flag stored in the predetermined memory area in the RAM of the control unit 39 is set to "1" ("ON"). If the communication controller 39a determines in step S71 that the CS Fallback flag is not set to "1" ("ON") (i.e., the CS Fallback flag is set to "0" ("OFF")) (NO in step S71), the communication controller 39a waits in step S71 and the mobile radio terminal 1 continues to be on standby in the 1x RTT system. On the other hand, if the communication controller 39a determines in step S71 that the CS Fallback flag is set to "1" ("ON") (YES in step S71), the process proceeds to step S72. In step S72, the communication controller 39a determines whether no search for an LTE base station has been performed after reselection to the cdma2000 base station (i.e., 1x RTT base station in this case) or the elapsed time t from the start of the previous LTE system search has exceeded an LTE-system-search start criterion T_interval.

Note that the case where no search for an LTE base station has been performed after reselection to the cdma2000 base station (i.e., 1x RTT base station in this case) includes the case where, after reselection to the 1x RTT base station through a CS Fallback operation, a transfer from one base station to another within the 1x RTT system (i.e., a reselection from a 1x RTT base station to another 1x RTT base station) has occurred but no search for an LTE base station has been performed. Therefore, every time a transfer from one base station to another within the 1x RTT system occurs, the process proceeds from step S72 to step 573.

If the communication controller 39a determines in step S72 that a search for an LTE base station has failed after reselection to the cdma2000 base station (1x RTT base station), and that the elapsed time t from the start of the previous LTE system search has not exceeded the LTE-system-search start criterion T_interval (NO in step S72), the process returns to step S71. In this case, the mobile radio terminal 1 continues to be on standby in the 1x RTT system.

On the other hand, if the communication controller 39a determines in step S72 that no search for an LTE base station has been performed after reselection to the cdma2000 base station (1x RTT base station), or that the elapsed time t from the start of the previous LTE system search has exceeded the LTE-system-search start criterion T_interval (YES in step S72), the process proceeds to step S73. In step S73, the communication controller 39a controls the antenna 31 and the radio transmission/reception unit 32 to search for an LTE base station. To avoid repetition, the search for an LTE base station will not be described in detail here, as it is the same as that performed in step S33 of FIG. 5.

In step S74, the communication controller 39a determines whether the search for an LTE base station has been successful. If the communication controller 39a determines in step S74 that the search for an LTE base station has been successful (YES in step S74), the process proceeds to step S75. In step S75, the communication controller 39a uses predetermined reselection criteria to determine whether to perform a reselection to the LTE base station successfully found. If the predetermined reselection criteria are met, the communication controller 39a controls the antenna 31, the radio transmission/reception unit 32, and the signal processing unit 33 to perform a reselection from the cdma2000 base station where the mobile radio terminal 1 is currently on standby to the LTE base station.

On the other hand, if the communication controller 39a determines in step S74 that the search for an LTE base station has been unsuccessful (NO in step S74), the process proceeds to step S76. In step S76, the communication controller 39a sets the LTE-system-search start criterion T_interval to determine the period of time before start of the next LTE system search. The LTE-system-search start criterion T_interval may not be a fixed value and may be changed. The LTE-system-search start criterion T_interval may be set on the basis of information about neighboring base stations, the information being notified from the 1x RTT system to the mobile radio terminal 1. If it is possible to confirm, from a 1x RTT base station, the presence of information about base stations of another system (e.g., EVDO system), the communication controller 39a may set T_interval to be short so that the frequency of searching for an LTE base station is higher than that for an EVDO base station.

After the LTE-system-search start criterion T_interval is set in step S76, the process proceeds to step S77. In step S77, the communication controller 39a uses the clock circuit 45 to reset the elapsed time t from the start of the LTE system search and starts measuring the elapsed time t from the start of the LTE system search again. Here, the mobile radio terminal 1 continues to be on standby in the cdma2000 system. Then, the process returns to step S71. Steps S71 and S72 are repeated until the elapsed time t from the start of the previous LTE system search exceeds the LTE-system-search start criterion T_interval. When the elapsed time t from the start of the previous LTE system search exceeds the LTE-system-search start criterion T_interval, the communication controller 39a determines in step S72 that the elapsed time t from the start of the previous LTE system search is greater than the LTE-system-search start criterion T_interval (YES in step S72). Then, the process proceeds to step S73, where a search for an LTE base station is performed.

Thus, when the mobile radio terminal 1 connected to an LTE system is forced to move to a 1x RTT system by a CS Fallback operation, the mobile radio terminal 1 can immediately search for an LTE base station to which it was originally connected. Then, when it is determined that the mobile radio terminal 1 will be able to be on standby in this LTE base station, the mobile radio terminal 1 can perform a reselection to return to the LTE system. Additionally, after the system to which the mobile radio terminal 1 is connected is changed from the LTE system to the 1x RTT system by the CS Fallback operation, the mobile radio terminal 1 can perform an LTE system search every time a reselection of a base station takes place within the 1x RTT system. Therefore, the mobile radio terminal 1 can quickly return to the LTE system. Moreover, if an LTE system search has ended unsuccessfully, the frequency of the LTE system search is reduced, so that an efficient LTE system search can be realized.

While being on standby in a 1x RTT base station, the mobile radio terminal 1 may search for an LTE base station by using CS Fallback information (e.g., flag information) indicating whether outgoing/incoming processing in the 1x RTT system has been performed and handover information (e.g., flag information) indicating whether a handover has occurred during connection to the 1x RTT system through a CS Fallback operation. Hereinafter, a CS Fallback flag ON setting process using this method will be described.

With reference to the flowchart of FIG. 9, a description will be given about a CS Fallback flag ON setting process performed in the mobile radio terminal 1 of FIG. 2. To avoid repetition, steps S101 to S104, S106, and S111 of FIG. 9 will not be described here, as they are basically the same as steps S51 to S56 of FIG. 6.

In step S105, the communication controller 39a stores, in the storage unit 40, LTE system information that is information about an LIE system to which the mobile radio terminal 1 is currently connected before being transferred to a 1x RTT system through a CS Fallback operation. The LTE system information to be stored is information necessary to perform an LTE system search when communication processing in the 1x RTT system ends upon completion of the CS Fallback operation. Examples of the LTE system information include a center frequency of the LTE system, and an identification code for a base station.

When a connection for circuit switching services in the 1x RTT system is realized, the communication controller 39a resets, in step S107, a CS Fallback HO_occurred flag stored in the predetermined memory area in the RAM of the control unit 39 to "0" ("OFF"). In step S108, the communication controller 39a controls the radio transmission/reception unit 32 and the signal processing unit 33 to determine whether a handover has occurred during connection to the 1x RTT system through the CS Fallback operation. If the communication controller 39a determines in step S108 that a handover has occurred during connection to the 1x RTT system through the CS Fallback operation (YES in step S108), the process proceeds to step S109. In step S109, the communication controller 39a sets the CS Fallback HO_occurred flag stored in the predetermined memory area in the RAM of the control unit 39 to "1" ("ON"). In step S110, the communication controller 39a stores the CS Fallback HO_occurred flag, which has been set to "1" ("ON") in step S109, in the predetermined memory area in the RAM of the control unit 39. On the other hand, if the communication controller 39a determines in step S108 that no handover has occurred during connection to the 1x RTT system through the CS Fallback operation (NO in step S108), the process bypasses steps S109 and S110, so that the CS Fallback HO_occurred flag stored in the predetermined memory area in the RAM of the control unit 39 remains to be set to "0" ("OFF").

In the embodiments of the present invention, the CS Fallback HO_occurred flag stored in the predetermined memory area in the RAM of the control unit 39 is used as handover information indicating whether a handover has occurred during connection to a 1x RTT system through a CS Fallback operation. However, the present invention is not limited to this. For example, the number of handovers that have occurred during connection to the 1x RTT system through the CS Fallback operation may be counted up.

Figure 7:
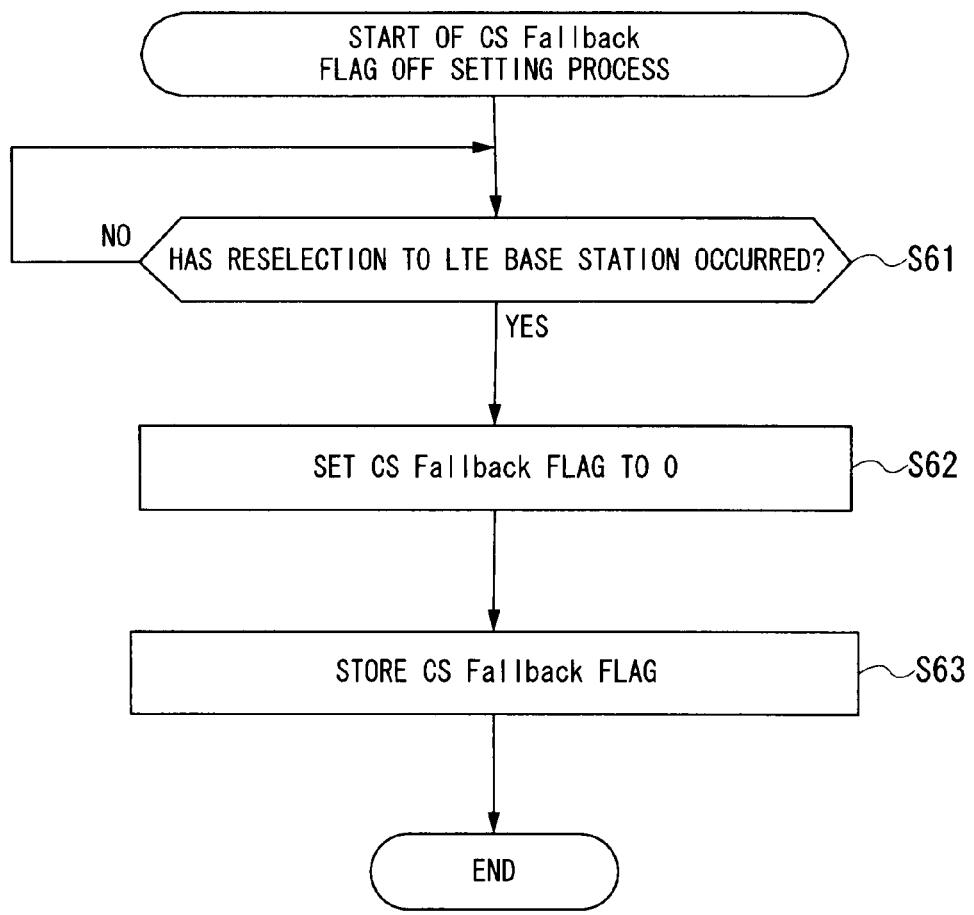
FIG. 7 is a flowchart illustrating a CS Fallback flag OFF setting process performed in the mobile radio terminal of FIG. 2.
Figure 8:
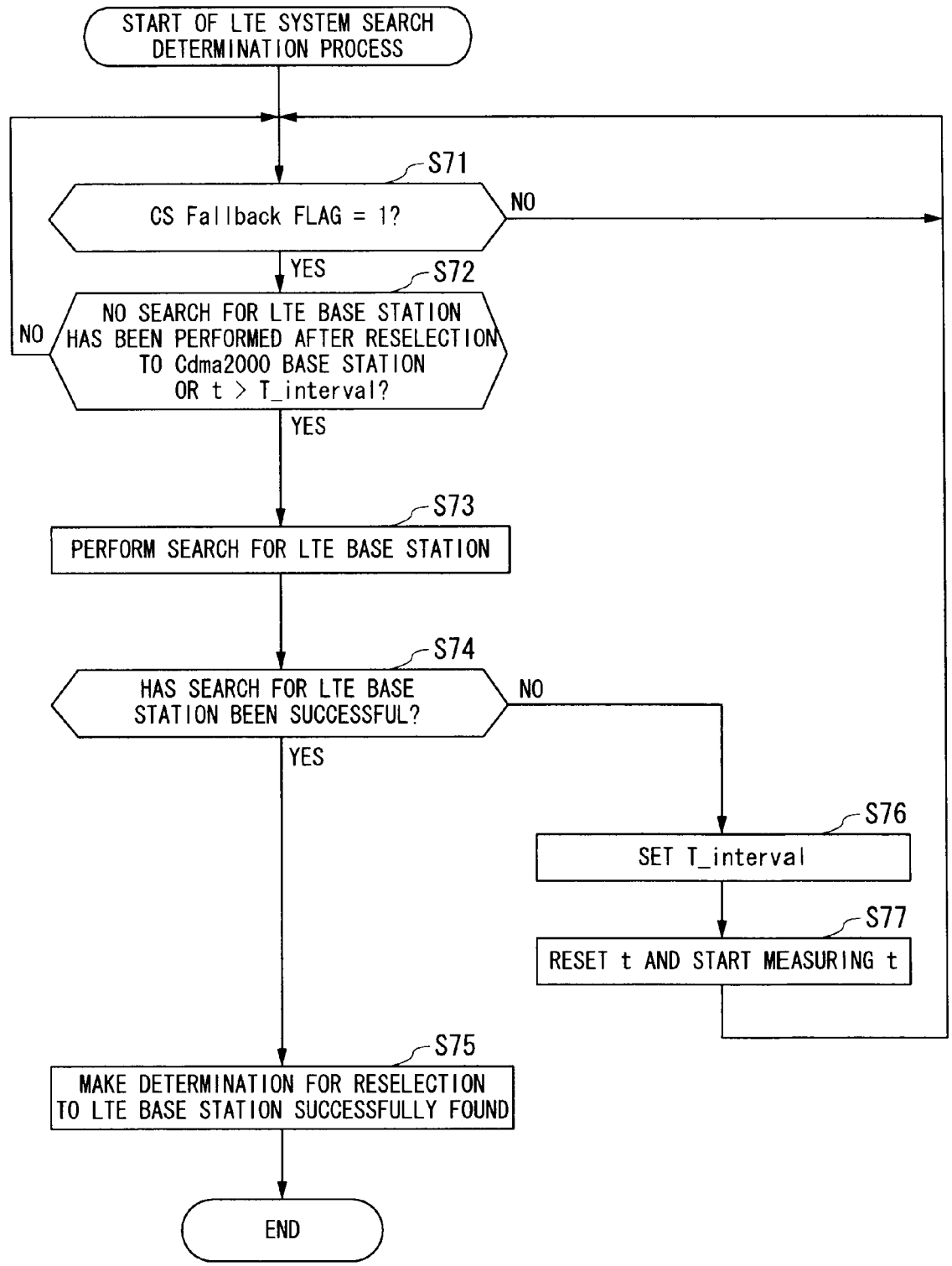
FIG. 8 is a flowchart illustrating an LTE system search determination process performed using a CS Fallback flag in the mobile radio terminal of FIG. 2.
Figure 9:
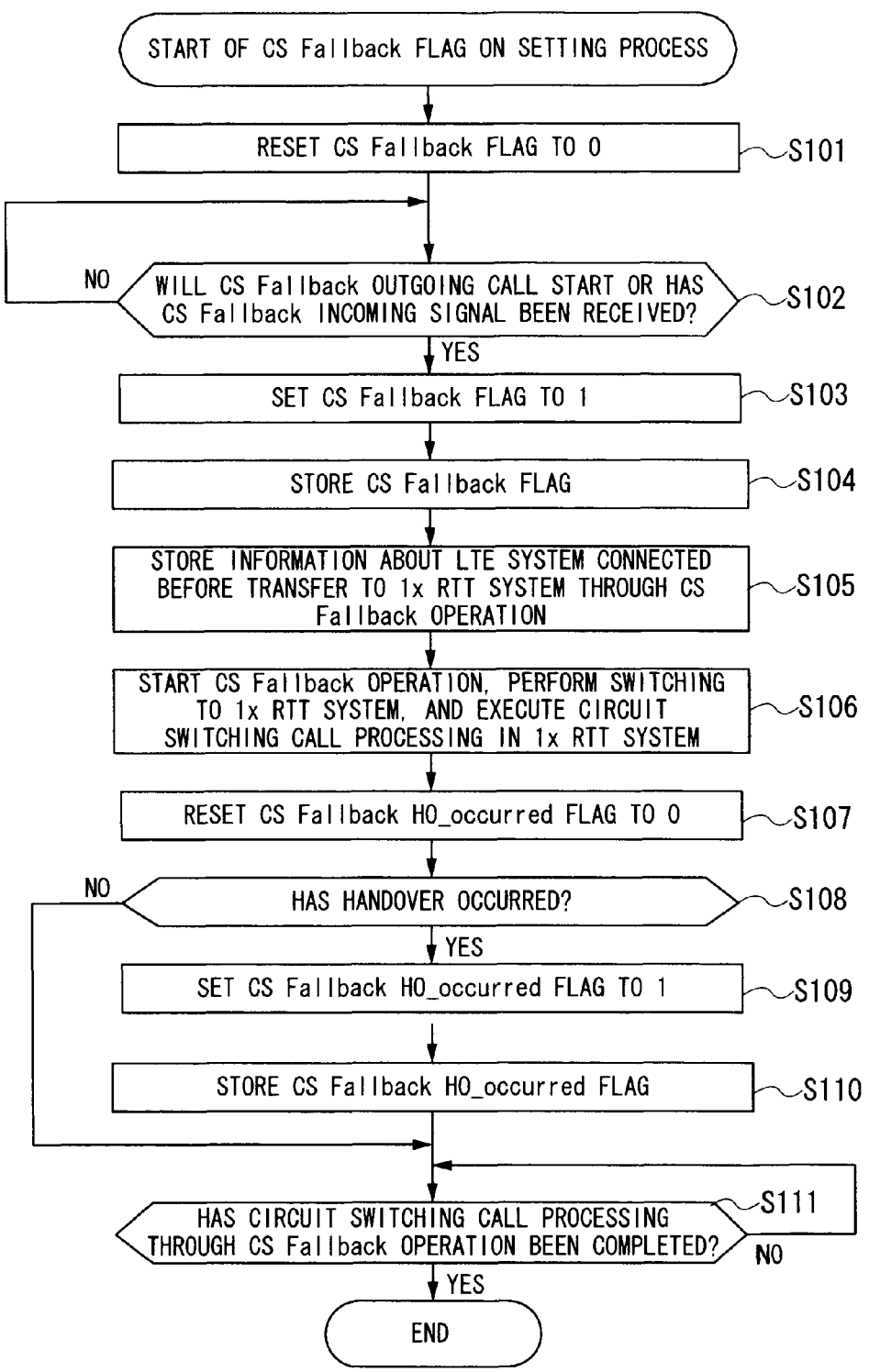
FIG. 9 is a flowchart illustrating another CS Fallback flag ON setting process performed in the mobile radio terminal of FIG. 2.

The CS Fallback HO_occurred flag set to "1" in the CS Fallback flag ON setting process of FIG. 9 is set to "0" ("OFF") simultaneously when the CS Fallback flag is set to "0" ("OFF") in step S62 of FIG. 7.

Figure 10:
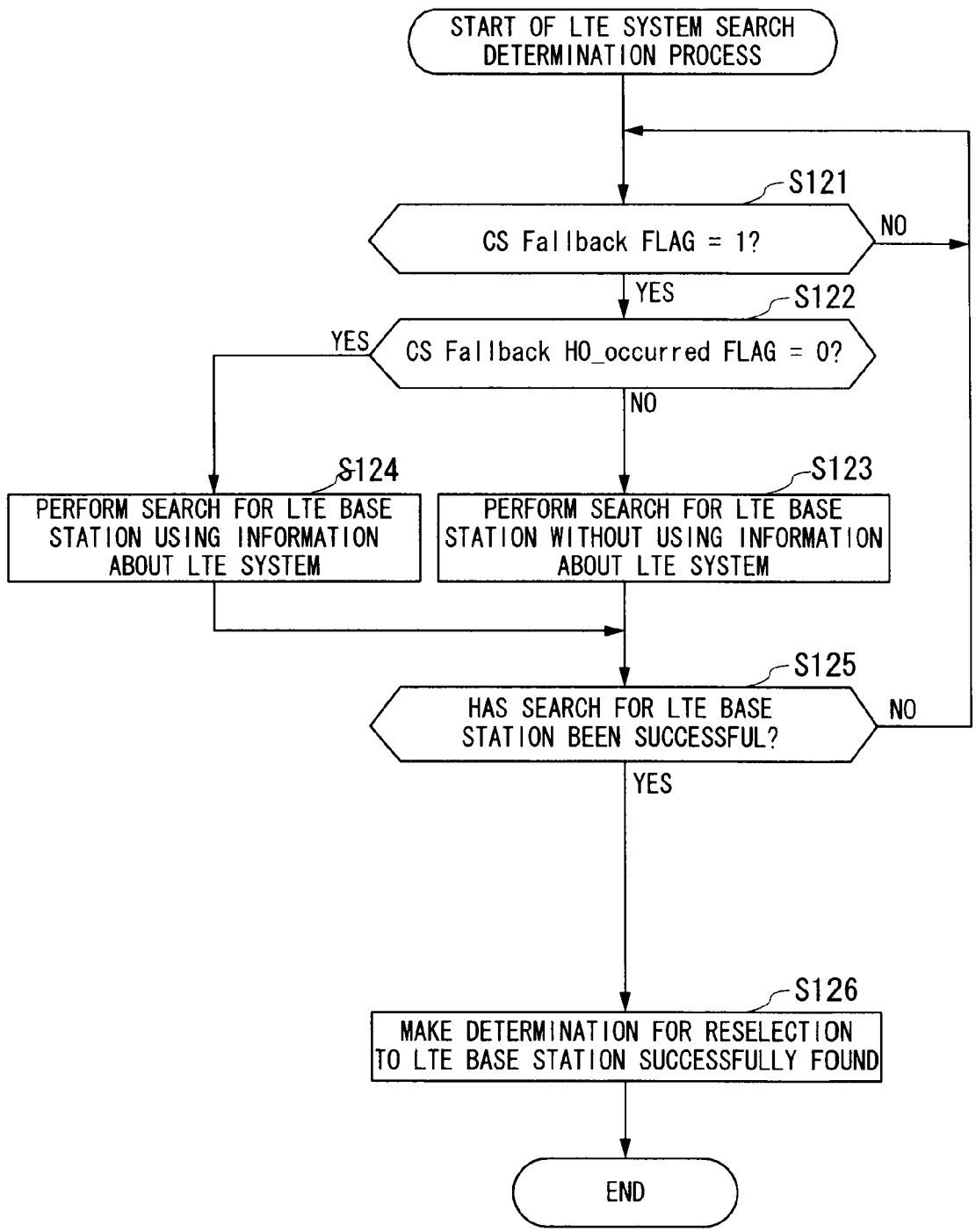
FIG. 10 is a flowchart illustrating an LTE system search determination process performed using a CS Fallback flag and a CS Fallback HO_occurred flag in the mobile radio terminal of FIG. 2.

Next, with reference to the flowchart of FIG. 10, a description will be given about an LTE system search determination process performed using a CS Fallback flag and a CS Fallback HO_occurred flag in the mobile radio terminal 1 of FIG. 2. Before start of the LTE system search determination process, the mobile radio terminal 1 is on standby in a 1x RTT system included in a cdma2000 system. As illustrated in the flowchart of FIG. 9, the CS Fallback flag and the CS Fallback HO_occurred flag are set to "0" or "1".

Upon starting the process for determining whether to start an LTE system search while the mobile radio terminal 1 is on standby in a 1x RTT base station, the communication controller 39a determines in step S121 whether the CS Fallback flag stored in the predetermined memory area in the RAM of the control unit 39 is set to "1" ("ON"). If the communication controller 39a determines in step S121 that the CS Fallback flag is not set to "1" ("ON") (i.e., the CS Fallback flag is set to "0" ("OFF")) (NO in step S121), the communication controller 39a waits in step S121 and the mobile radio terminal 1 continues to be on standby in the 1x RTT system. On the other hand, if the communication controller 39a determines in step S121 that the CS Fallback flag is set to "1" ("ON") (YES in step S121), the process proceeds to step S122. In step S122, the communication controller 39a determines whether the CS Fallback HO_occurred flag stored in the predetermined memory area in the RAM of the control unit 39 is set to "0" ("OFF") (i.e., the communication controller 39a determines whether no handover has occurred during connection to the 1x RTT system through the CS Fallback operation).

If the communication controller 39a determines in step S122 that the CS Fallback HO_occurred flag is set to "0" ("OFF") (YES in step S122), the communication controller 39a recognizes that no handover has occurred during connection to the 1x RTT system through the CS Fallback operation. Then, the process proceeds to step S124, where the communication controller 39a controls the antenna 31 and the radio transmission/reception unit 32 to search for an LTE base station by using LTE system information (i.e., information about an LTE system to which the mobile radio terminal 1 was connected before being transfer to the 1x RTT system through the CS Fallback operation) stored in the storage unit 40. Since no handover has occurred during connection through the CS Fallback operation, although the system to which the mobile radio terminal 1 is connected has been changed from the LTE system to the 1x RTT system, it is highly possible that the mobile radio terminal 1 is located within the reach of radio waves from an LTE base station where the mobile radio terminal 1 was on standby before the CS Fallback operation. Therefore, the communication controller 39a uses the LTE system information stored in the storage unit 40 to search for an LTE base station. Thus, as compared to the case where LTE system information is not used, the control unit 39 can quickly search for an LTE base station.

If the communication controller 39a determines in step S122 that the CS Fallback HO_occurred flag is set to "1" ("ON") (NO in step S122), the communication controller 39a recognizes that a handover has occurred during connection to the 1x RTT system through the CS Fallback operation. Then, the process proceeds to step S123, where the communication controller 39a controls the antenna 31 and the radio transmission/reception unit 32 to search for an LTE base station without using the LTE system information stored in the storage unit 40. This is because since a handover has occurred during connection through the CS Fallback operation, it is not known whether the mobile radio terminal 1 located in a coverage area of the 1x RTT base station with which the mobile radio terminal 1 communicates, the 1x RTT base station being the destination of the handover, is located within the reach of radio waves from an LTE base station where the mobile radio terminal 1 was on standby before the CS Fallback operation. Thus, the communication controller 39a searches for an LTE base station without using the LTE system information stored in the storage unit 40.

In step S125, the communication controller 39a determines whether the search for an LTE base station has been successful. If the communication controller 39a determines in step S125 that the search for an LTE base station has been successful (YES in step S125), the process proceeds to step S126. In step S126, the communication controller 39a uses predetermined reselection criteria to determine whether to perform a reselection to the LTE base station successfully found. If the predetermined reselection criteria are met, the communication controller 39*a* controls the antenna 31, the radio transmission/reception unit 32, and the signal processing unit 33 to perform a reselection from the cdma2000 base station (1x RTT base station) where the mobile radio terminal 1 is currently on standby to the LTE base station. On the other hand, if the communication controller 39*a* determines in step S125 that the search for an LTE base station has been unsuccessful (NO in step S125), the process returns to step S121.

Thus, when the mobile radio terminal 1 connected to an LTE system is forced to move to a 1x RTT system by a CS Fallback operation, the mobile radio terminal 1 can immediately search for an LTE system. In particular, if no handover has occurred during connection through the CS Fallback operation, the communication controller 39*a* searches for an LTE system using information about LTE system where the mobile radio terminal 1 was on standby before the CS Fallback operation. Therefore, it is possible to reduce time required for searching for an LTE base station, so that the mobile radio terminal 1 can quickly return to the LTE system.

Figure 11:
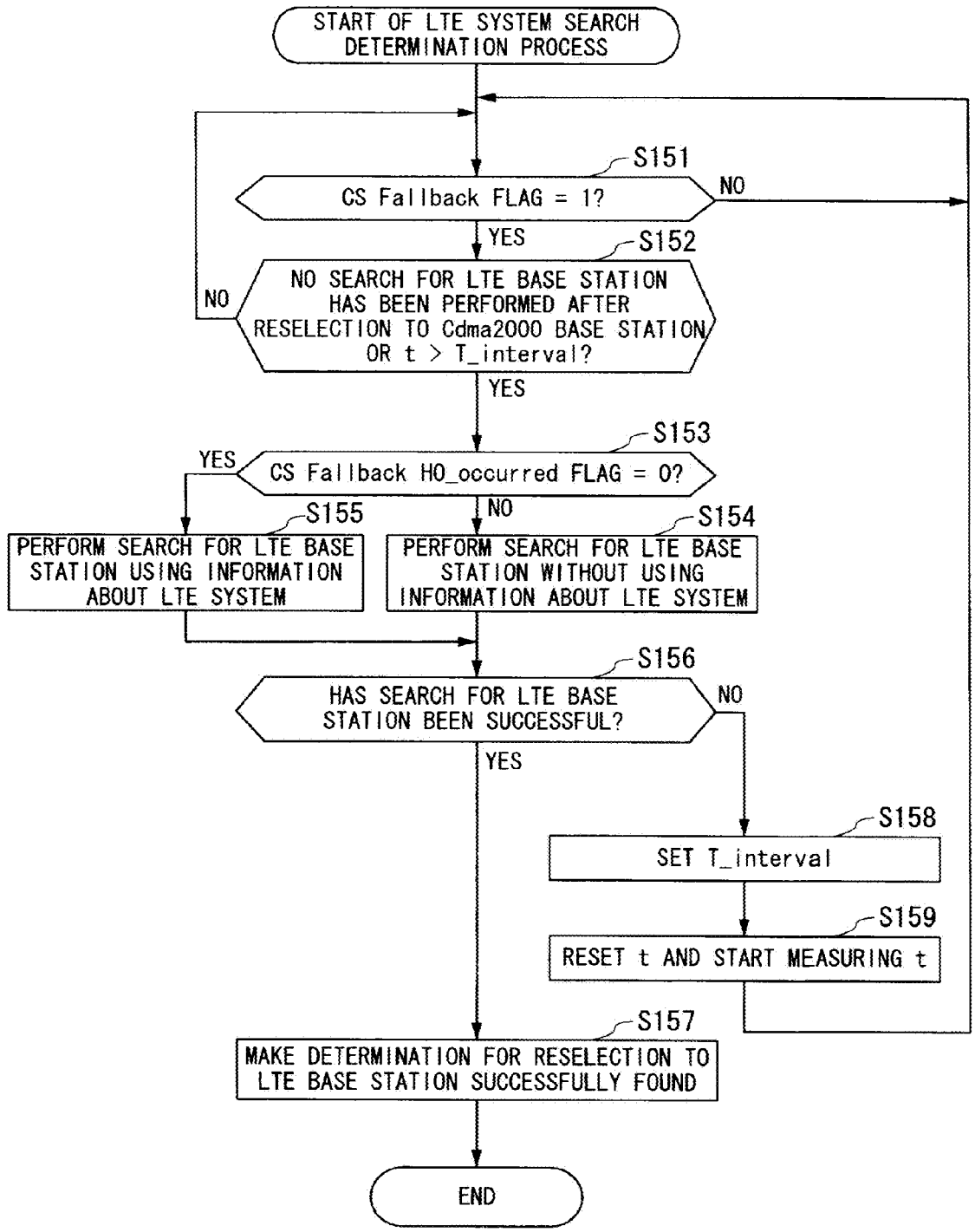
FIG. 11 is a flowchart illustrating another LTE system search determination process performed using a CS Fallback flag and a CS Fallback HO_occurred flag in the mobile radio terminal of FIG. 2.

In the LTE system search determination process using the CS Fallback flag and the CS Fallback HO_occurred flag, if a search for an LTE base station is not successful, the LTE-system-search start criterion T_interval may be set such that the search for an LTE base station is performed at each predetermined LTE-system-search start criterion T_interval. This process is illustrated by a flowchart of FIG. 11. The process of FIG. 11 is a combination of the processes of FIG. 8 and FIG. 10. To avoid repetition, the description of the process of FIG. 11 will be omitted.

In the present invention, information indicating transfer from an E-UTRAN system and an event for the transfer are stored and used, so that it is possible to control a search for an E-UTRAN base station when a mobile radio terminal is on standby in a cdma2000 system (1x RTT system/1x EVDO system).

The series of processes described in the embodiments of the present invention can be performed either by software or hardware.

In the embodiments of the present invention described above, the steps in the flowcharts are performed sequentially in the described order. However, the steps may be performed simultaneously or individually, and do not necessarily have to be performed sequentially.

What is claimed is:
1. A mobile radio terminal comprising:
a first communicating unit configured to communicate with a base station belonging to a first mobile communication network including a circuit switching network;
a second communicating unit configured to communicate with a base station belonging to a second mobile communication network connected to the first mobile communication network;
a storage unit configured to store transfer information indicating whether a base station to which the mobile radio terminal is connected is changed from a base station belonging to the second mobile communication network to a base station belonging to the first mobile communication network;
a determining unit configured to determine, by using the transfer information stored by the storage unit, whether, after the base station to which the mobile radio terminal is connected is changed from a base station belonging to the second mobile communication network to a base station belonging to the first mobile communication network, the mobile radio terminal is on standby in the base station belonging to the first mobile communication network; and
a search control unit configured to control the second communicating unit so as to search for a base station belonging to the second mobile communication network, when the determining unit determines that the mobile radio terminal is on standby in a base station belonging to the first mobile communication network after the base station to which the mobile radio terminal is connected is changed from a base station belonging to the second mobile communication network to the base station belonging to the first mobile communication network.

2. The mobile radio terminal according to claim 1, wherein when the search control unit succeeds in the search for a base station belonging to the second mobile communication network, the search control unit controls the second communicating unit so as to reselect a base station belonging to the second mobile communication network.

3. The mobile radio terminal according to claim 1, wherein when the search control unit fails in the search for a base station belonging to the second mobile communication network, the search control unit sets a first search restart time before a restart of the search and controls the second communicating unit so as to re-search for a base station belonging to the second mobile communication network when the first search restart time elapses.

4. The mobile radio terminal according to claim 3, wherein when quality of a reception signal from the base station which belongs to the first mobile communication network is below a predetermined reference value and where the mobile radio terminal is on standby, the first search restart time is set such that the frequency of searching for a base station belonging to the second mobile communication network is higher than the frequency of searching for a base station belonging to the first mobile communication network.

5. The mobile radio terminal according to claim 3, wherein when the search control unit fails in the search for a base station belonging to the second mobile communication network, the search control unit sets a second search restart time before a restart of the search and, while the mobile radio terminal is on standby in the base station belonging to the first mobile communication network, when the base station to which the mobile radio terminal is connected is changed from the base station belonging to the first mobile communication network to another base station belonging to the first mobile communication network and the second search restart time elapses, the search control unit controls the second communicating unit so as to re-search for a base station belonging to the second mobile communication network.

6. The mobile radio terminal according to claim 1, wherein in case where the mobile radio terminal is on standby in a base station belonging to the first mobile communication network after the base station to which the mobile radio terminal is connected is changed from a base station to the second mobile communication network to the base station belonging to the first mobile communication network, when the base station to which the mobile radio terminal is connected is changed from the base station belonging to the first mobile communication network to another base station belonging to the first mobile communication network, and when the quality of a reception signal from the base station which belongs to the first mobile communication network is greater than a predetermined reference value and where the mobile radio terminal is on standby, the search control unit controls the second communicating unit so as to search for a base station belonging to the second mobile communication network.

7. The mobile radio terminal according to claim 1, further comprising a setting unit configured to set the transfer information to a first state when the base station to which the mobile radio terminal is connected is changed from a base station belonging to the second mobile communication network to a base station belonging to the first mobile communication network, and set the transfer information to a second state when the base station to which the mobile radio terminal is connected is changed from a base station belonging to the first mobile communication network to a base station belonging to the second mobile communication network or when the base station to which the mobile radio terminal is connected is changed from a base station belonging to the first mobile communication network to another base station belonging to the first mobile communication network, wherein the storage unit stores the transfer information set to the first state or the second state by the setting unit.

8. The mobile radio terminal according to claim 1, wherein the first mobile communication network is a cdma2000-based communication network including a cdma2000 1x RTT-based communication network and a cdma2000 EVDO-based communication network, and the second mobile communication network is an E-UTRAN-based communication network.

9. A mobile radio terminal comprising:
a first communicating unit configured to communicate with a base station belonging to a first mobile communication network including a circuit switching network;
a second communicating unit configured to communicate with a base station belonging to a second mobile communication network connected to the first mobile communication network;
a first storage unit configured to store communication request information indicating whether a communication request is made to the circuit switching network;
a first determining unit configured to determine, by using the communication request information stored by the storage unit, whether, after a base station to which the mobile radio terminal is connected is changed from a base station belonging to the second mobile communication network to a base station belonging to the first mobile communication network, the mobile radio terminal is on standby in the base station belonging to the first mobile communication network; and
a search control unit configured to control the second communicating unit so as to search for a base station belonging to the second mobile communication network, when the first determining unit determines that the mobile communication network is on standby in a base station belonging to the first mobile communication network after the base station to which the mobile radio terminal is connected is changed from a base station belonging to the second mobile communication network to the base station belonging to the first mobile communication network.

10. The mobile radio terminal according to claim 9, wherein when the search control unit succeeds in the search for a base station belonging to the second mobile communication network, the search control unit controls the second communicating unit so as to reselect a base station belonging to the second mobile communication network.

11. The mobile radio terminal according to claim 9, wherein when the search control unit fails in the search for a base station belonging to the second mobile communication network, the search control unit sets a search restart time before a restart of the search and controls the second communicating unit so as to re-search for a base station belonging to the second mobile communication network when the search restart time elapses.

12. The mobile radio terminal according to claim 11, wherein when notification information from the first mobile communication network notifies the mobile radio terminal that a base station belonging to an EVDO-based communication network included in the first mobile communication network is located near a base station which belongs to the first mobile communication network and where the mobile radio terminal is on standby, the search restart time is set such that the frequency of searching for a base station belonging to the second mobile communication network is higher than the frequency of searching for a base station belonging to the EVDO-based communication network included in the first mobile communication network.

13. The mobile radio terminal according to claim 9, wherein the first mobile communication network is a cdma2000-based communication network including a cdma2000 1x RTT-based communication network and a cdma2000 EVDO-based communication network, and the second mobile communication network is an E-UTRAN-based communication network.

14. The mobile radio terminal according to claim 9, wherein while the mobile radio terminal is on standby in a base station belonging to the first mobile communication network after the base station to which the mobile radio terminal is connected is changed from a base station belonging to the second mobile communication network to the base station belonging to the first mobile communication network, every time the base station to which the mobile radio terminal is connected is changed from a base station belonging to the first mobile communication network to another base station belonging to the first mobile communication network, the search control unit controls the second communicating unit so as to search a base station belonging to the second mobile communication network.

15. The mobile radio terminal according to claim 9, further comprising a setting unit configured to set the communication request information to a first state when a communication request is made to the circuit switching network, and set the communication request information to a second state when, after communication with the circuit switching network, the base station to which the mobile radio terminal is connected is changed from a base station belonging to the first mobile communication network to a base station belonging to the second mobile communication network, wherein the first storage unit stores the communication request information set to the first state or the second state by the setting unit.

16. The mobile radio terminal according to claim 9, wherein the communication request to the circuit switching network is a CS Fallback outgoing request or a CS Fallback incoming request.

17. The mobile radio terminal according to claim 9, further comprising:
a second storage unit configured to store handover information indicating whether a handover occurs during communication with the circuit switching network; and
a second determining unit configured to determine, by using the handover information stored by the second storage unit, whether a handover occurs during communication with the circuit switching network,
wherein when the second determining unit determines that no handover occurs during communication with the circuit switching network, the search control unit controls the second communicating unit so as to search for a base station belonging to the second mobile communication network, by using information about the second mobile communication network to which the mobile radio terminal is connected before being transferred to a base station belonging to the first mobile communication network through a communication operation to the circuit switching network.

18. The mobile radio terminal according to claim 17, wherein when the second determining unit determines that a handover occurs during communication with the circuit switching network, the search control unit controls the second communicating unit so as to search for a base station belonging to the second mobile communication network, without using information about the second mobile communication network to which the mobile radio terminal is connected before being transferred to a base station belonging to the first mobile communication network through a communication operation to the circuit switching network.

19. A communication processing method comprising:
preparing a mobile radio terminal having a first communicating unit configured to communicate with a base station belonging to a first mobile communication network including a circuit switching network;
storing transfer information indicating whether a base station to which the mobile radio terminal is connected is changed from a base station belonging to the second mobile communication network to a base station belonging to the first mobile communication network; and
controlling the second communicating unit so as to search for a base station belonging to the second mobile communication network, when a determination using the stored transfer information is made that the mobile radio terminal is on standby in a base station belonging to the first mobile communication network after the base station to which the mobile radio terminal is connected is changed from a base station belonging to the second mobile communication network to the base station belonging to the first mobile communication network.

20. A communication processing method comprising:
preparing a mobile radio terminal having a first communicating unit configured to communicate with a base station belonging to a first mobile communication network including a circuit switching network and a second communicating unit configured to communicate with a base station belonging to a second mobile communication network connected to the first mobile communication network;
storing communication request information indicating whether a communication request is made to the circuit switching network; and
controlling the second communicating unit so as to search for a base station belonging to the second mobile communication network, when a determination using the stored communication request information is made that the mobile radio terminal is on standby in a base station belonging to the first mobile communication network after the base station to which the mobile radio terminal is connected is changed from a base station belonging to the second mobile communication network to the base station belonging to the first mobile communication network.

* * * * *